United States Patent [19]
Lindén et al.

[11] Patent Number: 4,949,574
[45] Date of Patent: Aug. 21, 1990

[54] TESTING DEVICE FOR VEHICLE TIRES
[75] Inventors: Unto Lindén, Hämeenlinna; Erkki Suvanto, Porvoo, both of Finland
[73] Assignee: Neste Oy, Finland
[21] Appl. No.: 380,895
[22] Filed: Jul. 14, 1989
[51] Int. Cl.⁵ .............................................. G01M 17/02
[52] U.S. Cl. .............................................. 73/146; 73/8
[58] Field of Search .................................. 73/146, 8, 9
[56] References Cited
FOREIGN PATENT DOCUMENTS
1071942  2/1984  U.S.S.R. ................................ 73/146

Primary Examiner—Donald O. Woodiel
Attorney, Agent, or Firm—Steinberg & Raskin

[57] ABSTRACT

A testing device for vehicle tires, especially anti-skid features situated in the vehicle tire, in which the tire to be tested is pressed against an outer circle or surface of another tire, while these two tires are rotated in opposite directions. The other tire acting as a counterpart or pair for the tire being tested is a pneumatic tire, while the tire to be tested and the other tire are disposed to be pressed against one another so that a contact surface between the two tires is substantially straight. The other tire acting as the pair or counterpart for the tire to be tested is provided with a wear surface having good wear resistance properties.

22 Claims, 3 Drawing Sheets

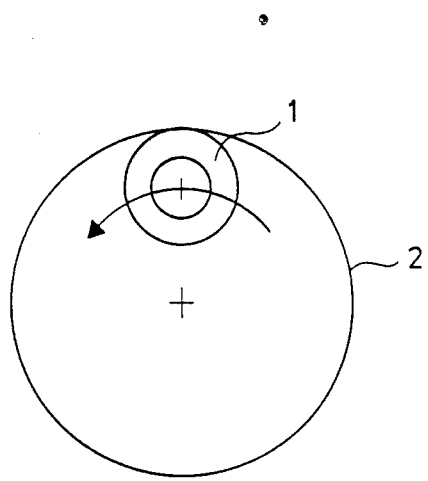
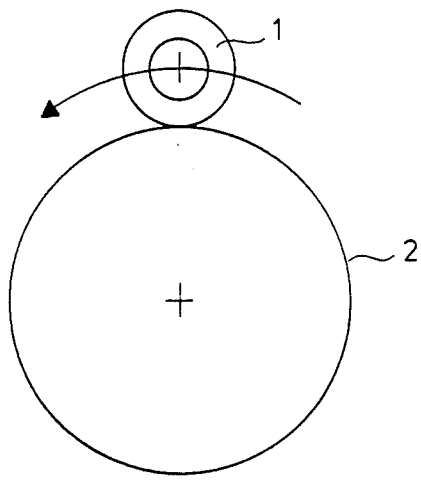
FIG. A1  FIG. A2
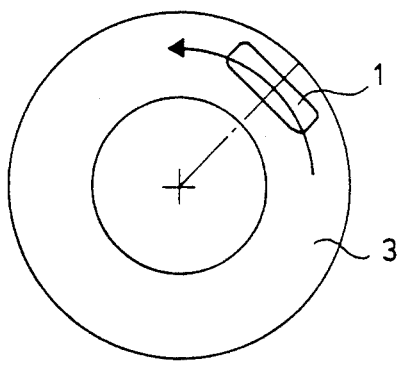
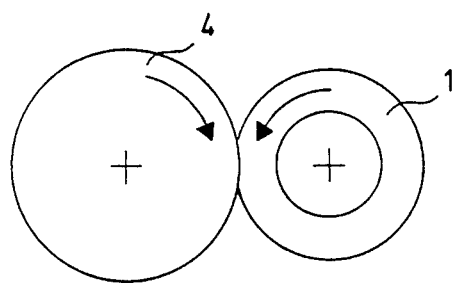
FIG. A3  FIG. A4
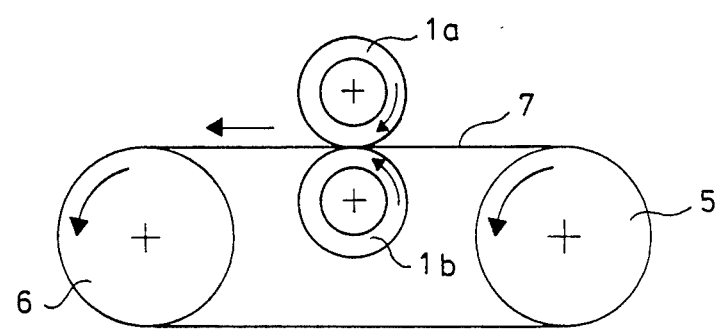
FIG. A5

TESTING DEVICE FOR VEHICLE TIRES

BACKGROUND OF THE INVENTION

The present invention concerns testing means for vehicle tires and anti-skid means, in which a vehicle tire to be tested is pressed against an outer circle or circumference of another tire while rotating the tires in opposite directions of rotation.

Several different apparatus are known in the prior art for testing vehicle tires and particularly anti-skid means placed in these tires. One such means of the state of the art is schematically illustrated in FIG. A1. The means of FIG. A1 comprises a stationary circle 2 provided with a wear surface, along the inner periphery of which a tire 1 to be tested is arranged to roll. In FIG. A2 another means of the state of the art is presented in which the tire 1 to be tested rolls along the outer periphery of a stationary circle 2. However, a significant drawback of this apparatus is that the tire 1 to be tested meets the circle 2 in an incorrect position, whereby it is not possible to simulate ordinary driving on a road with arrangements such as those described above.

In addition to the apparatus illustrated in FIGS. A1 and A2, an embodiment is known in which the circle 2 has been arranged to be rotatable, whereby the speed of rotation of the tire 1 to be tested is equally increased.

A third means of the state of the art is illustrated in FIG. A3, in which the tire 1 to be tested has been arranged to rotate along a circle 3 situated horizontally, this circle being either stationary or rotating. A drawback of this apparatus is, in turn, that the arrangement corresponds to continuous curve driving, whereby driving in the direct direction cannot be simulated with such means. In FIG. A4, another means of the state of art is presented in which, in a way, is a special application of FIG. A2. In the design of FIG. A4, the pair or counterpart for the tire 1 to be tested is a hard wheel, e.g. made of asphalt concrete, against which the tire 1 to be tested is pressed while rotating so that both the tire to be tested and the wheel 4 rotate. A poor feature of this design is the same as with the means of FIG. A2, i.e. that the tire 1 meets the wheel 4 in an incorrect position which is not equivalent to driving on a road.

Furthermore, additional means of the state of the art are presented in FIG. A5 comprising a belt roll system with an endless belt 7 carried around return rolls 5 and 6 and against which two tires 1a and 1b to be tested are urged on two opposite sides of the belt 7. In this arrangement, the tire 1a or 1b to be tested is arranged to meet the belt in a position equivalent to a position of driving on a road. A significant drawback of this apparatus, however, is that the design of the testing means is exceedingly complex and the belt 7 being used in the apparatus is of a special structure and is very expensive.

SUMMARY OF THE INVENTION

Accordingly, it is an object of the present invention to provide novel and improved testing means in which the drawbacks related to the apparatus of the state of the art described above are avoided, and with which essential improvement is, at the same time, provided relative to the state of the art.

These and other objects are attained by the present invention which is directed to a device for testing a vehicle tire including anti-skid means of the tire, wherein the tire to be tested is pressed against an outer surface of another tire while rotating the tires in opposite directions, said another tire is a pneumatic tire, and comprising means for disposing the tire to be tested and said another tire to be pressed against one another such that a contact surface between the tires is substantially straight.

Accordingly, for implementing the above objects and those which will become apparent below, the present invention is characterized by the other tire acting as the counterpart or pair for the tire to be tested, being a pneumatic tire, and the tire to be tested and the other tire being disposed to be pressed against one another so that a contact surface between the two tires is substantially straight.

Several advantages are attained with the present invention, of which e.g., the following may be set forth.

In an arrangement conforming to the basic concepts of the present invention, two pneumatic tires are urged against one another, whereby a straight contact surface is produced between the two tires, at which the testing situation is equivalent to normal driving on a road. Since the contact surface is straight, the anti-skid means present in the tire to be tested are made to meet the surface of the opposite tire in correct position.

Other advantages of the apparatus of the present invention include, for instance, testing being feasible at high speeds with the inventive apparatus. By turning either tire or both tires, it is easy to generate various drift angles with the apparatus of the invention and to study the effect of such angles on the tire being tested and on the anti-skid means present therein. By coating the rotating tire acting as the counterpart or pair for the tire being tested with an appropriate wear layer, e.g. by pitching, the wearing effect of the anti-skid means present in the tire being tested can be studied rapidly. The measurement made may be simply carried out by weighing.

The other advantages and characteristic features of the invention will become apparent from the following detailed description of the invention herein.

BRIEF DESCRIPTION OF THE DRAWINGS

The present invention will be described below, with reference to the figures of the accompanying drawings, in which FIGS. A1–A5 are schematic representations of prior art testing devices.

DESCRIPTION OF THE PREFERRED EMBODIMENTS

Figure 1:
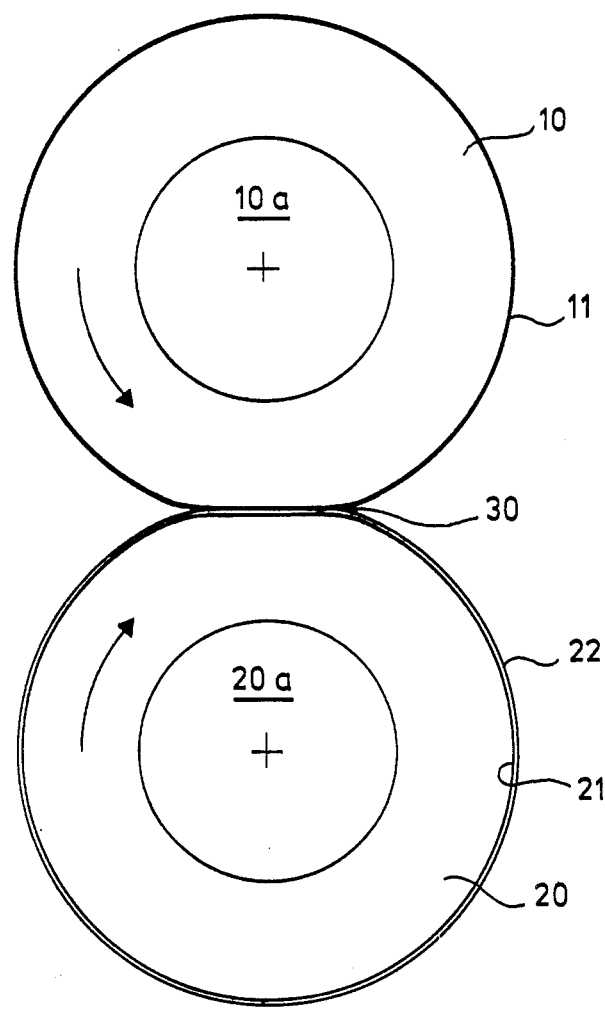
FIG. 1 is a schematic elevational view of a basic concept of the testing means according to the present invention.
Figure 2:
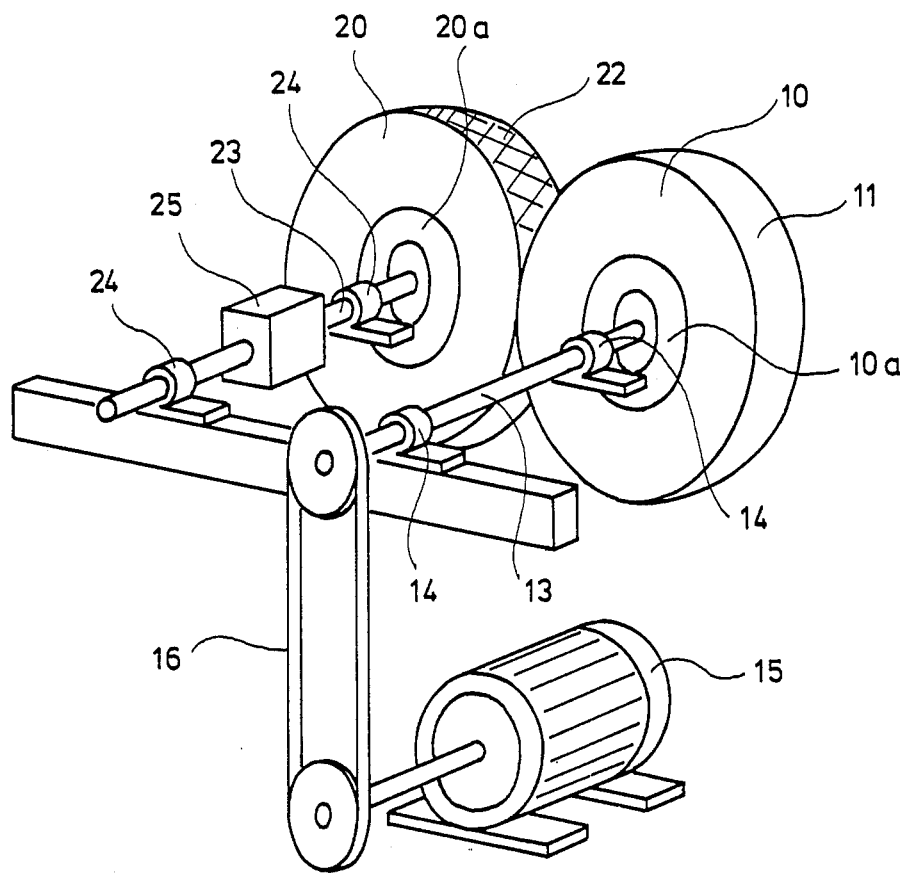
FIG. 2 is a schematic perspective view of testing means according to the present invention, provided with appropriate driving and brake means.

In FIGS. 1 and 2, the tire to be tested is generally denoted by reference numeral 10. Reference numeral 10a refers to a rim of the tire to be tested, and reference numeral 11 indicates the outer surface of the tire 10 to be tested. The tire 20 acting as the counterpart or pair for the tire 10 to be tested is a pneumatic tire which is conventionally mounted on a rim 20a. On an outer surface 21 of the pneumatic tire 20, an appropriate wear surface is disposed which is generally denoted by reference numeral 22. The wear surface 22 may be provided, e.g., by means of pitching the outer surface 21 of the pneumatic tire, or the wear surface 22 may, e.g., comprise a steel belt mounted on the surface 21 of the tire 20 or an equivalent belt provided with good wear resistance properties.

In the testing means of the invention, the tire 10 being tested and the pneumatic tire 20 acting as its counterpart or pair are pressed against one another at the same time as they are being rotated. Since both of the tires 10 and 20 are pneumatic tires in the testing means of the present invention, a straight contact surface is provided at the point of contact 30 of these tires 10 and 20, whereby the testing situation corresponds to conditions on a road. Shape and length of the contact surface 30 between the tires 10 and 20 may be varied, e.g. by changing pressures in the tires 10 and 20. On the other hand, the other tire 20 acting as the counterpart or pair for the tire 10 being tested may be larger in diameter than the tire 10 being tested, whereby the contact surface 30 between the tires 10 and 20 is furthermore increased.

FIG. 2 illustrates the inventive apparatus in a schematic perspective view, being simplified for the sake of clarity. In FIG. 2, the body structure for the testing means has been omitted. In the embodiment illustrated in FIG. 2, the rim 10a of the tire 10 being tested is mounted on a shaft 13 which is supported by bearings 14 to the body of the testing means. The tire 10 being tested is rotated with appropriate drive means 15, for instance with an electromotor, from which the power is transmitted to the shaft 13 of the tire 10 being tested by means of an appropriate power transmission member 16, for instance a belt, chain, or equivalent.

The power transmission may also be arranged from the drive means 15 to the tire 10 being tested in a manner different from FIG. 2, whereby one alternative is hydrostatic power transmission between the drive means 15 and the tire 10 being tested. The other tire 20 acting as the pair or counterpart for the tire 10 being tested has, in an equivalent manner, been mounted on a rim 20a, this being mounted on another shaft 23. The other shaft 23 has respectively been supported on the body of the testing means with bearings 24, and according to an embodiment of the present invention, brake means have been arranged on the other shaft 23 as indicated by reference numeral 25. The brake means 25 may be, e.g., mechanical, hydraulic, or controlled so that controlled sliding is obtained between the tires 10 and 20.

In FIG. 2, the tire illustrated as driving the testing means is the tire 10 to be tested, but naturally either tire 10 or 20 may act as the driving tire. If the testing means comprise brake means 25 illustrated in FIG. 2, it is clear that such brake means 25 exert its influence on the other tire, rather than the tire to which the driving has been transmitted. Since the tire 10 being tested in the testing means is pressed against the tire 20, it is advantageous if at least one of the tires of the testing means is displaceable in a radial direction towards the opposite tire and away therefrom.

In an advantageous embodiment of the present invention, either one or both of the tires 10 or 20 of the testing means have been arranged to be turnable relative to the opposite tire, whereby a situation may be studied with the testing means which is equivalent to driving on curves under road conditions. In other words, for changing the drift angle between the tires, at least one of the tires may be arranged to be turnable, e.g. in an axial direction thereof.

If a separate steel belt or equivalent is used for the wear surface 22 acting on the surface of one of the tires 10, the wear surface 22 is required to be fixed exceedingly firmly to the other tire 20 in the embodiment of the present invention, so that the wear surface 22 cannot slide off from the tire 20. In the testing means of the invention, the driving speed can also be changed easily during test driving, while changing of the drift angle is also additionally simple. The acceleration and braking forces present in the apparatus are easy to control, especially when one of the tires is provided with brake means 25.

The testing means of the invention is especially well-suited for studying tires provided with anti-skid means. i.e. spiked tires. By providing one of the tires 20 with an appropriate wear surface 22, it is possible to study the wearing down of the spike against a response surface with the testing means. Additionally, the testing means offer exceedingly good opportunities to study behavior of a spike when it impinges on a response surface, because the testing means of the invention may be conveniently provided with an X-ray apparatus with which the contact situation of the tires 10 and 20 can be photographed.

The X-raying may be performed either in a static situation or in a dynamic situation during driving, whereby the angle of impingement of the spike on the base can be determined. Hence, on the basis of the X-ray photographs which have been taken, it is feasible to select, e.g., the spike mounting position to be proper in the tire 10 being tested and, on the other hand, it is possible to study in the testing means the behavior of various spikes in a tire and respectively the effect of tires provided with different wear surface patterns respectively on the behavior of the spike in a road impingement situation. The required information concerning the behavior of the spike is rapidly obtained and well-demonstrated with the aid of the X-ray apparatus.

The invention has been described above with reference to certain exemplary features thereof, and to which, however, the present invention is not intended to be exclusively confined. Numerous modifications are feasible within the scope of the inventive concepts set forth above. In other words, the preceding description of the present invention is merely exemplary, and is not intended to limit the scope thereof in any way.

What is claimed is:

1. Device for testing a vehicle tire including anti-skid means of the tire, wherein
    the tire to be tested is pressed against an outer surface of another tire while rotating the tires in opposite directions,
    said another tire is a pneumatic tire, and comprising means for disposing the tire to be tested and means for disposing said another tire to be pressed against one another such that a contact surface between the tires is substantially straight and that respective axes of rotation of said tire to be tested and said another tire are substantially parallel.

2. The device of claim 1, wherein said another tire comprises a wear surface having good wear resistance properties.

3. The device of claim 2, wherein said wear surface comprises a steel belt attached to the outer surface of said another tire.

4. The device of claim 2, wherein said wear surface is provided by pitching the outer surface of said another tire.

5. The device of claim 1, additionally comprising means for driving one of the tires.

6. The device of claim 5, wherein said driving means are arranged to drive the tire to be tested.

7. The device of claim 5, wherein said driving means are arranged to drive said another tire.

8. The device of claim 1, additionally comprising means for braking one of the tires.

9. The device of claim 8, wherein said braking means are arranged to brake said another tire.

10. The device of claim 8, wherein said braking means are arranged to brake the tire to be tested.

11. The device of claim 1, additionally comprising means for driving the tire to be tested, and
means for braking said another tire.

12. The device of claim 1, additionally comprising means for displacing at least one of the tires in a radial direction with respect to an opposite tire.

13. The device of claim 1, comprising
means for changing a drift angle between the tires which comprise means for mounting at least one of the tires to be turnable in an axial direction thereof and with respect to an opposite tire.

14. The device of claim 1, additionally comprising
means for changing drift angles between the tires and means for changing driving speed during driving of said device.

15. Device for testing a vehicle tire including anti-skid means of the tire, wherein
the tire to be tested is pressed against an outer surface of another tire while rotating the tires in opposite directions,
said another tire is a pneumatic tire, and comprising
means for disposing the tire to be tested and means for disposing said another tire to be pressed against one another such that a contact surface between the tires is substantially straight, wherein said another tire comprises a wear surface having good wear resistance properties, and wherein said wear surface comprises a steel belt attached to the outer surface of said another tire.

16. The device of claim 15, additionally comprising means for driving the tire to be tested, and means for braking said another tire.

17. The device of claim 15, comprising means for changing the draft angle of the tires which comprise a means for mounting at least one of the tires to be turnable in an axial direction thereof and with respect to an opposite tire.

18. The device of claim 15, additionally comprising means for changing draft angles between the tires and means for changing draft angles between the tires and means for changing driving speed during driving of said device.

19. Device for testing a vehicle tire including anti-skid means of the tire, wherein
the tire to be tested is pressed against an outer surface of another tire while rotating the tires in opposite directions,
said another tire is a pneumatic tire, and comprising
means for disposing the tire to be tested and means for disposing said another tire to be pressed against one another such that a contact surface between the tires is substantially straight, wherein said another tire comprises a wear surface having good wear resistance properties, and wherein said wear surface is provided by pitching the outer surface of said another tire.

20. Device for testing a vehicle tire including anti-skid means of the tire, wherein
the tire to be tested is pressed against an outer surface of another tire while rotating the tires in opposite directions,
said another tire is a pneumatic tire, and comprising
means for disposing the tire to be tested and means for disposing said another tire to be pressed against one another such that a contact surface between the tires is substantially straight, additionally comprising means for braking one of the tires.

21. The device of claim 20, wherein said braking means are arranged to brake said another tire.

22. The device of claim 20, wherein said braking means are arranged to brake the tire to be tested.

* * * * *